INVENTOR
JORGE V. SOLARI
BY Ogle P. Singleton
ATTORNEY

Feb. 26, 1957  JORGE VIALE S.  2,782,512
INSTRUMENTS FOR MEASURING ANGLES
Filed Sept. 23, 1952  5 Sheets-Sheet 3

INVENTOR
JORGE VIALE SOLARI

BY Ogle R. Singleton
ATTORNEY

Feb. 26, 1957 — JORGE VIALE S. — 2,782,512
INSTRUMENTS FOR MEASURING ANGLES
Filed Sept. 23, 1952 — 5 Sheets-Sheet 5

INVENTOR
JORGE VIALE SOLARI

BY Ogle R. Singleton
ATTORNEY

United States Patent Office 2,782,512
Patented Feb. 26, 1957

2,782,512
INSTRUMENTS FOR MEASURING ANGLES

Jorge Viale S., Piura, Peru

Application September 23, 1952, Serial No. 311,172

1 Claim. (Cl. 33—72)

My invention consists in a new and useful improvement in instruments for measuring angles and is designed to provide an instrument for measuring the angle formed by two lines from the instrument to two observed points. Instruments now in use for this purpose utilize scales on which are indicated divisions of a circle and employ a movable indicating member to co-act with the scale, the movement of the member from an initial position, i. e., on the first line, to its adjusted position, i. e., on the second line, indicating on the scale the measure of the angle formed by the lines. The practical problem presented in the manufacture of these instruments is to make a scale and an indicating member therefor which can co-act to indicate the measure of an angle with that degree of exactitude desired. The limitations of dimensions of an instrument which can be advantageously manufactured and used controls the size of both the scale and the indicating member. The scale must be dimensioned according to the size of the instrument, thereby limiting the intervening spaces between the divisions which obviously must be comprehended on a circumference of an element of the instrument. The indicating means must indicate a precisely selected point in one of such intervening spaces, in order to show the measure of the angle with the desired exactitude.

The result is effected in the instrument to be described by utilizing a series of indicating lines for the divisions of each of the scales and so relating said two scales that the lines of one series form angles with the lines of the other series, as the auxiliary scale moves over the main scale.

My invention involves novel construction in the pivotal mounting of the parts of angle measuring instruments designed to provide selectively for joint and for relative rotation of such parts, and in an advantageous manner.

While I have illustrated in the drawings and hereinafter fully describe certain embodiments of my invention, it is to be distinctly understood that I do not consider my invention to be limited to said embodiments but refer for its scope to the claim appended hereto.

Figure 1:
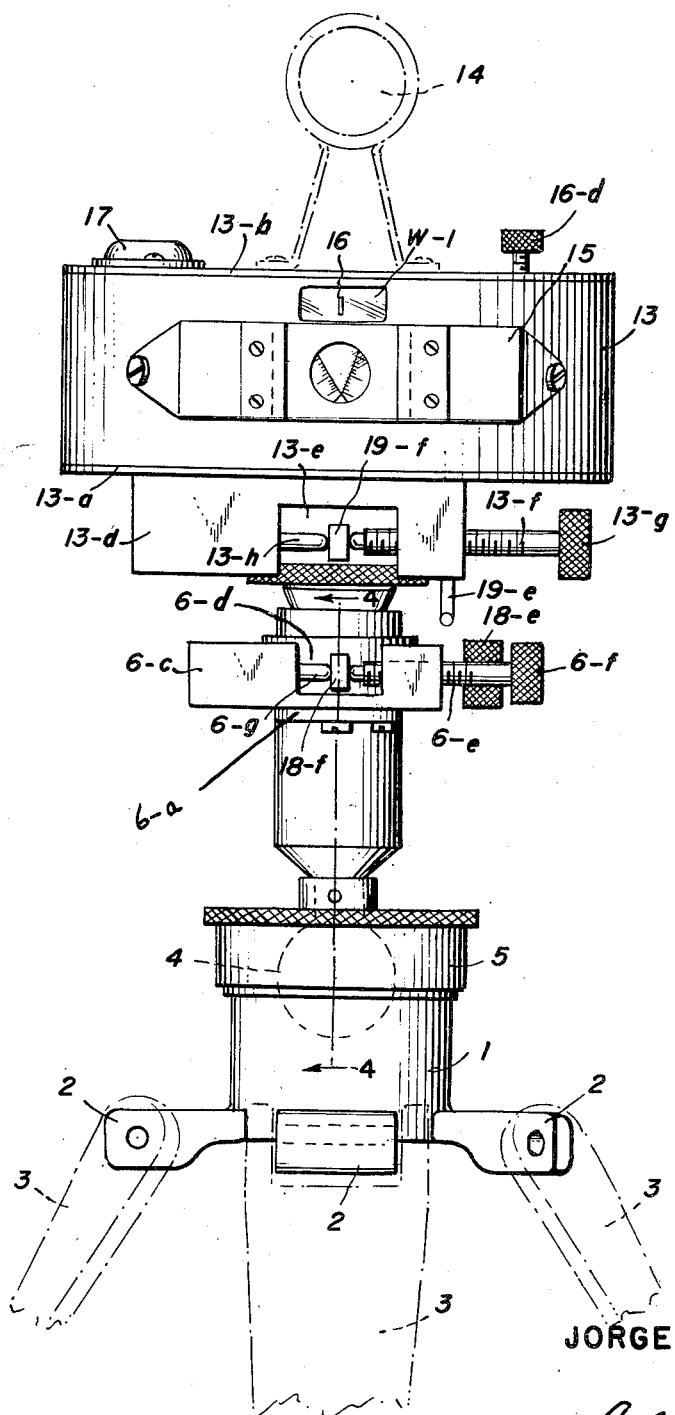
Fig. 1 is a front elevation of my improved instrument.
Figures 2, 3, 4:
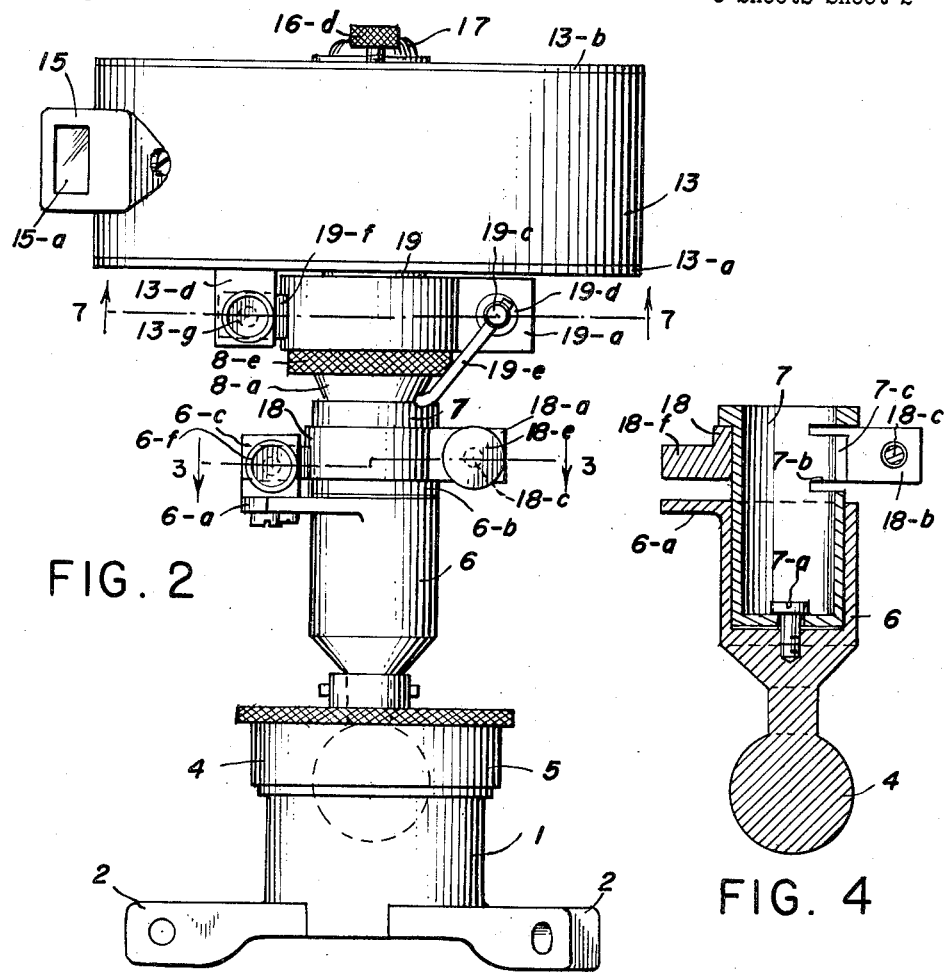
Fig. 2 is a side elevation of the instrument, the telescopic sight being removed.
Fig. 3 is a horizontal section on the line 3—3 of Fig. 2, in the direction of the arrows.
Fig. 4 is a vertical section on the line 4—4 of Fig. 1, in the direction of the arrows.

As shown in the drawings, my improved instrument has a pedestal 1 with three radial arms 2 in which legs 3, shown in broken lines in Fig. 1, are pivoted to provide a tripod mounting for the instrument. The pedestal 1 has a hemi-spherical socket in which is received a ball 4 which can be locked in adjusted positions by a collar 5 threaded on the pedestal 1. Fixed on the ball 4 there is a hollow post 6 having a radial lug 6–a. A sleeve 7 is mounted in the post 6 (Fig. 4) by a bolt 7–a screwed into post 6, the sleeve 7 being rotatable in post 6 about the screw 7–a. The sleeve 7 has slots 7–b to form resilient fingers 7–c (Figs. 3 and 4). A hollow shaft 8 (Fig. 6) is rotatably mounted in the sleeve 7, its peripheral flange 8–a resting upon the upper end of the sleeve 7 (Figs. 1 and 2). The shaft 8 has a conical bore 8–b in which is mounted a tapered solid shaft 9 biased into yielding engagement with the shaft 8 by a coil spring 10 having one end mounted in a socket 8–c in the lower end of the shaft 8 and its other end confined by a plate 10–a bolted to the lower end of the shaft 9. The socket 8–c is closed by a plate 8–d threaded in the end of the shaft 8. The shaft 8 has formed integral with its upper end a drum 11. The shaft 9 has formed integral with its upper end a circular plate 12 having formed integral therewith a cylinder 13 having a lower closure 13–a threaded in its bottom and an upper cover 13–b threaded in its top. The closure 13–a is provided with a suitable bearing 13–c for the shaft 8 passing through the cover 13–a. The cover 13–b has mounted thereon any suitable form of telescopic sight 14.

The drum 11 has inscribed upon its outer surface 11–a (Fig. 6) a series of vertical division lines L (Fig. 9) comprising the main scale S of measurement for the instrument. As shown in the drawings, the scale S comprises sixty-four indicating lines from 0 to 63, dividing the circumference of the drum 11 into sixty-four equal spaces, each comprising one hundred mils.

Figure 9:
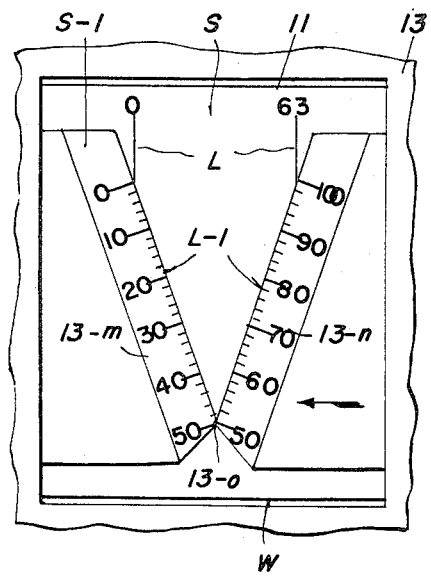
Fig. 9 is a greatly enlarged fragmentary view showing the auxiliary scale shown in Fig. 1, the auxiliary scale being so related to the main scale that the zero indicating lines precisely register, for the beginning of the measuring operation.
Figure 10:
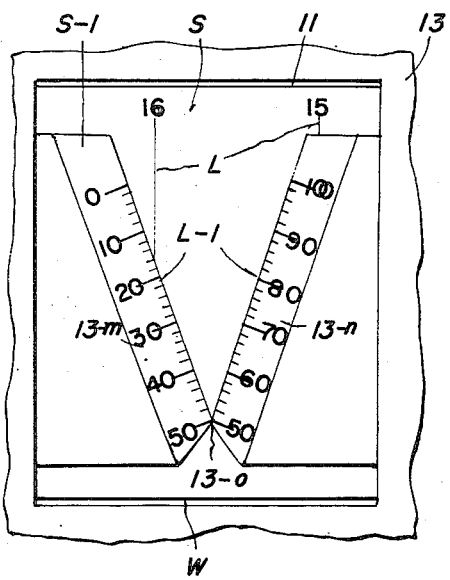
Fig. 10 is a view similar to Fig. 9, the auxiliary scale being so related to the main scale as to indicate the measure of the angle, at the completion of the operation.

The cylinder 13 carries a V-shaped auxiliary scale S–1 which is suitably mounted in a window W in the cylinder 13. This scale S–1 is inscribed on two members 13–m and 13–n which are relatively disposed at an acute angle 13–o (Fig. 9). The member 13–m bears indicating lines L–1 running downwardly from 0 to 50, and the member 13–n bears indicating lines running upwardly from 50 to 100. It will be noted (Fig. 9) that the horizontal distance from the zero line L–1 to the 100 line L–1 of the scale S–1 is precisely identical with the intervening space between each two of the lines L of the scale S, a space of 100 mils. The lines L–1 of the scale S–1, from 0 to 100, serve to indicate each of the one hundred divisions of 1 mil each in each space between the lines L. It is obvious from Fig. 9 that the linear measurement from the zero line L–1 to the 50 line L–1 and from the 50 line L–1 to the 100 line L–1 is four times the linear measurement of one of the intervening spaces between two of the lines L of the scale S. Thus by my novel combination of the scales S and S–1, I have quadrupled the measurement interval between the lines L of the scale S.

Figure 5:
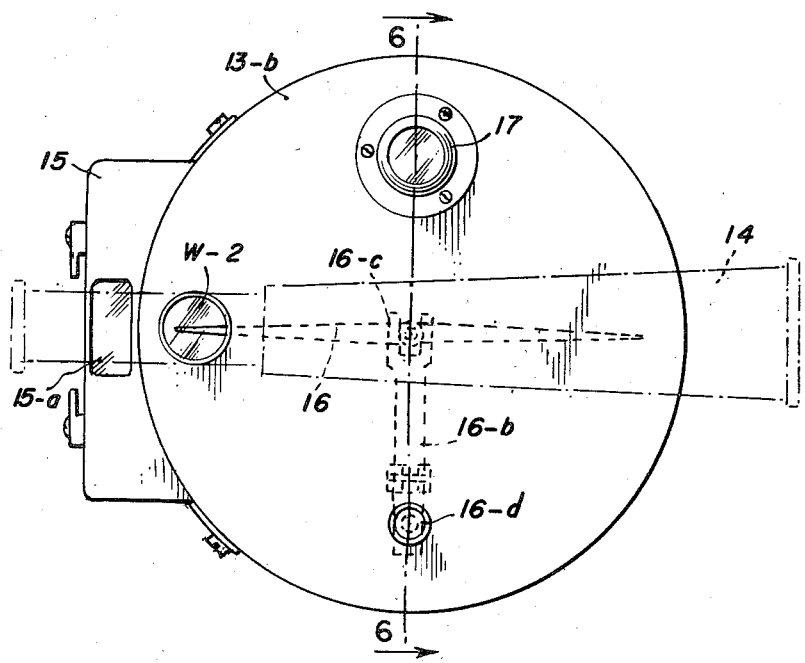
Fig. 5 is a top plan of the instrument.

The scales S and S–1 are so related that rotation of the cylinder 13 relative to the drum 11 causes the auxiliary scale S–1 to pass across the lines L of the scale, the lines L–1 of the scale S–1 forming angles with the lines L of the scale S. A bracket 15 is mounted on the cylinder 13 (Figs. 1, 2 and 5) in front of the window W, in which any suitable magnifying means can be removably mounted, for viewing scales S and S–1 through the window W. The bracket 15 has windows 15–a in its top and ends to admit light to facilitate viewing.

Figure 6:
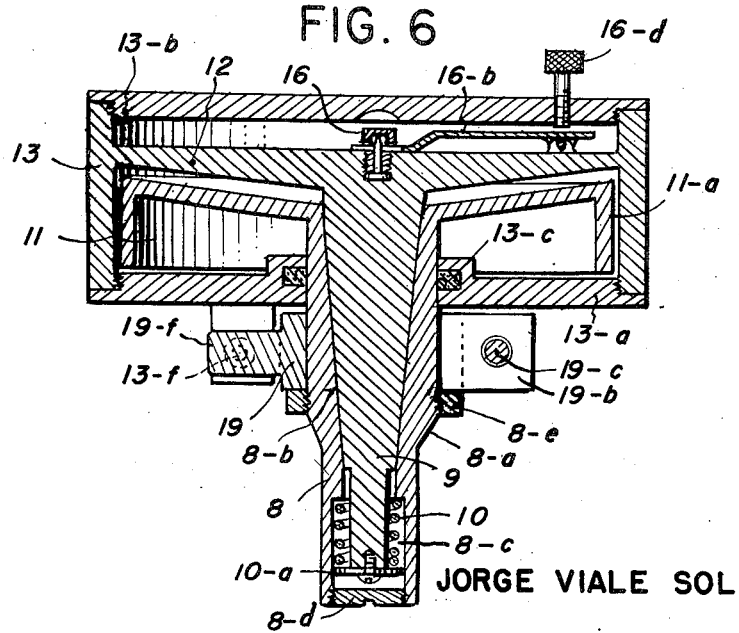
Fig. 6 is a vertical section on the line 6—6 of Fig. 5, in the direction of the arrows.

A magnetic needle 16 (Figs. 5, 6 and 8) is mounted on an anti-friction pin 16–a in the center of the plate 12 (Fig. 6). A scale S–2 (Fig. 8) is mounted on the plate 12, having an indicator mark S–3 for co-operation with the needle 16. A lever 16–b is suitably pivoted on plate 12 and has a fork 16–c embracing pin 16–a and below the needle 16. A control rod 16–d for lever 16–b is screwed through the upper cover 13–b (Fig. 6) for rocking the lever 16–b to lock the needle 16 in fixed relation to the scale S–2. A window W–1 in the cylinder 13 (Fig. 1) and a window W–2 in the upper cover 13–b afford means to observe the needle 16.

A bubble level device 17 is mounted on the cover 13–b (Figs. 1 and 2).

I will now describe the means provided for effecting the desired adjustments of the several operative elements of my improved instrument.

The means for effecting relative adjustment of the post 6, sleeve 7 and shaft 8 (Figs. 1, 2, 3 and 4) comprises a collar 18 about the sleeve 7 and resting upon a washer 6–b (Fig. 2) about the sleeve 7 and on the upper end of post 6. This collar 18 has wings 18–a and 18–b (Fig. 3). A bolt 18–c is passed loosely through wing 18–a and screwed into wing 18–b and has a flange 18–d for engagement with wing 18–a. It is obvious that when bolt 18–c is set up by means of its knurled head 18–e, the wings 18–a and 18–b will be drawn together to compress the collar 18 about sleeve 7. It will be noted (Fig. 3) that the collar 18 is so disposed on the sleeve 7 as to bear against the fingers 7–c of the sleeve 7, so that pressure exerted by compression of the collar 18 will compress fingers 7–c to grip shaft 8, to effect unitary rotation of sleeve 7 and shaft 8 in the post 6.

The means for effecting this rotation for fine adjustment comprises a bracket 6–c mounted on the radial lug 6–a of the post 6, having a slot 6–d into which extends a finger 18–f on the collar 18. This finger 18–f is rotated in one direction by a bolt 6–e threaded in bracket 6–c and having a knurled head 6–f, and in the other direction by a biased pin 6–g mounted in bracket 6–c.

Figure 7:
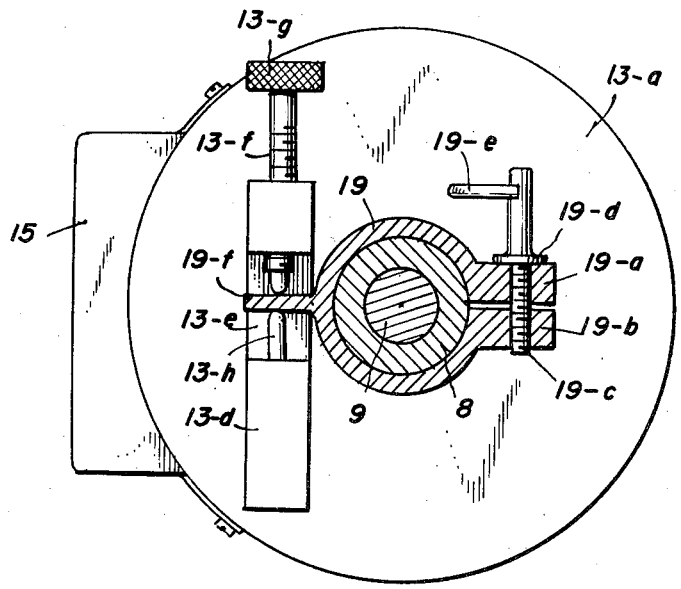
Fig. 7 is a horizontal section on the line 7—7 of Fig. 2, in the direction of the arrows.

The means for effecting relative adjustment of the shaft 8 and the shaft 9, carrying the drum 11 and the cylinder 13, respectively, and consequently the relative adjustment of the main scale S and the auxiliary scale S–1 on the drum 11 and the cylinder 13, respectively (Figs. 1, 2, 6 and 7), comprises a collar 19 about the shaft 8 and resting on a ring 8–e threaded on the shaft 8 above the flange 8–a. This collar 19 has wings 19–a and 19–b (Fig. 7). A bolt 19–c is passed loosely through wing 19–a and screwed into wing 19–b and has a flange 19–d for engagement with wing 19–a. It is obvious that when bolt 19–c is set up by means of its operating crank 19–e, the wings 19–a and 19–b will be drawn together to compress the collar 19 about the shaft 8, so that the collar 19 will grip the shaft 8.

The means for effecting rotation for fine adjustment of shaft 9 relative to shaft 8 and consequently of scale S–1 relative to scale S comprises a bracket 13–d (Fig. 7) fixed on the lower closure 13–a of the cylinder 13 on shaft 9 and having a slot 13–e into which extends a finger 19–f on the collar 19. This finger 19–f serves as an abutment, when the shaft 8 is immobilized relative to the sleeve 7 by the collar 18 and the collar 19 grips the shaft 8, whereby the cylinder 13 may be rotated in one direction by a screw 13–f threaded in bracket 13–d and having a knurled head 13–g and in the other direction by a biased pin 13–h mounted in bracket 13–d.

Figure 11:
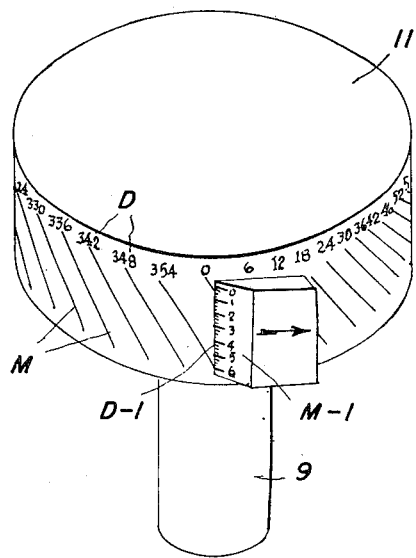
Fig. 11 is a diagrammatic view of a modified form of my instrument, the scales being so related that the zero indicating lines precisely register for the beginning of the measuring operation.
Figure 12:
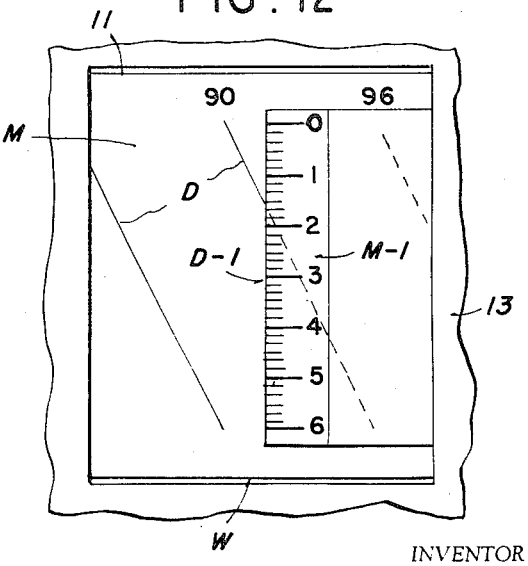
Fig. 12 is a greatly enlarged fragmentary view showing the auxiliary scale shown in Fig. 11 indicating the measurement, at the completion of the operation.

A modified form of my instrument is illustrated in Figs. 11 and 12 which are merely diagrammatic views to illustrate the features of the modified form which differ from those of the above-described form, it being understood that such features as are not shown in Figs. 11 and 12 are identical with those of the above-described form.

The modified form has a main scale M and an auxiliary scale M–1. The main scale M comprises a series of sixty diagonal indicating lines D inscribed on the outer surface 11–a of the drum 11, numbered from 0 to 354 and dividing the circumference of the drum 11 into sixty equal spaces, each space corresponding to six degrees of the circumference. It will be noted (Fig. 12) that the obliquity of lines D is such that the upper end of each successive line D lies directly above the lower end of the preceding line D. The auxiliary scale M–1 comprises a series of seven lines D–1, numbered from 0 to 6, dividing the scale M–1 into six equal spaces, each indicating a degree, and each space is divided into six spaces, each indicating ten minutes. It will be noted that the vertical distance on the scale M–1, from the 0 line D–1 to the 6 line D–1, precisely corresponds with the vertical distance from the upper end of a line D to the lower end of its preceding line D.

Having described the structural elements of my improved instrument, I will now describe its operation for measuring the angle formed by the two straight lines extending from the instrument to two observed points. It is to be noted (Figs. 1, 4 and 6) that the post 6, the sleeve 7, the shaft 8 and the shaft 9 are coaxial and that their common axis passes through the center of the ball 4. It is to be understood that the vertical cross-hair of the telescopic sight 14 lies in a vertical plane passing through said axis (Fig. 1) and that the median point on the scale S–1 lies in said plane. The sight 14 and the scale S–1 being fixed on the cylinder 13 are relatively immovable.

The instrument is set up for use by disposing the legs 3 to form a support therefor and the parts being in the position shown in Fig. 1, the ball 4 is adjusted in the socket of the post 6 to accurately level the upper cover 13–b of the cylinder 13 as indicated by the bubble level device 17 thereon. The shaft 8 is locked against rotation relative to the post by tightening the collar 18. The cylinder 13 is released for rotation relative to the scale by loosening the collar 19. The cylinder 13 is rotated about the drum 11 until the 0 mark of the scale S–1 is brought into close proximity with the 0 mark of the scale S. The collar 19 is tightened to grip the locked shaft 8, thereby immobilizing the finger 19–f to serve as a fixed abutment. The screw 13–f is manipulated to rotate the cylinder 13 sufficiently to register precisely the 0 mark of the scale S–1 with the 0 mark of the scale S (Fig. 9). The instrument is now conditioned for determination of the first line.

The shaft 8 is now unlocked relative to the post by releasing the collar 18. The cylinder 13 is rotated until the cross-hair of the sight 14 is brought into close proximity of the first observed point. It is to be noted that this rotation of the cylinder 13 causes the drum 11 to rotate synchronously therewith, due to the engagement of the tapered shaft 9 with the hollow shaft 8, due to the action of the spring 10 (Fig. 6) and due to the action of the collar 19. This unitary rotation of drum 11 and cylinder 13 maintains the adjusted relation of the scales S and S–1. The shaft 8 is then locked relative to the post by tightening the collar 18, the collar 19 remaining tightened to hold the finger 19–f immobile to maintain fixed the relation of the drum 11 and the cylinder 13. The bolt 6–e is manipulated to cause unitary rotation of sleeve 7, shaft 8, shaft 9, drum 11 and cylinder 13 sufficiently to register precisely the cross-hair of sight 14 upon the first observed point, thereby determining the first observed line.

The collar 19 is then loosened from shaft 8 locked by collar 18, releasing the cylinder 13, while drum 11 on shaft 8 is immobile. The cylinder 13 is rotated until the cross-hair of the sight 14 is brought into close proximity of the second observed point. During this rotation of the cylinder 13, the scale S–1 passes over the scale S which is fixed. The collar 19 is tightened to hold its finger 19–f immobile. The bolt 13–f is manipulated to rotate cylinder 13 sufficiently to register precisely the cross-hair of the sight 14 upon the second observed point, thereby determining the second observed line.

When the cylinder 13 has been so adjusted, the scale S–1 has moved to the precise point on the scale S to indicate by the junction of the last line L to appear through window W with one of the lines L–1 of the scale S–1 the exact measure of the angle formed by the two lines from the instrument to the two observed points.

Figure 8:
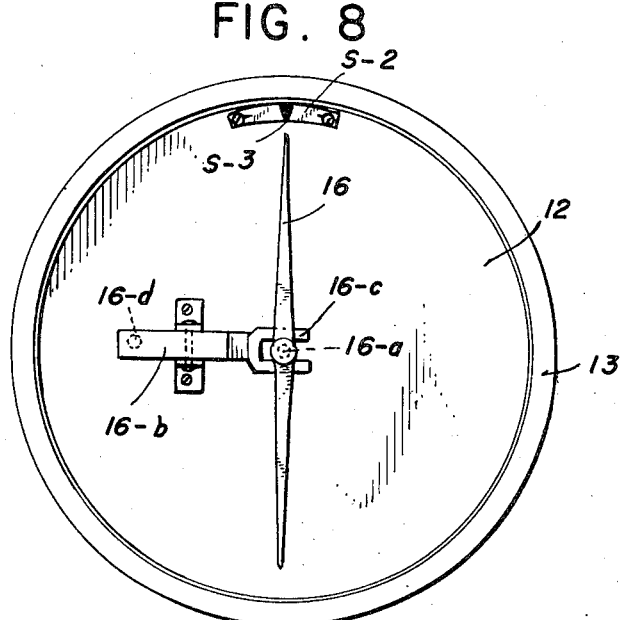
Fig. 8 is a top plan, the cover plate and parts shown in Fig. 5 being removed.

I will now describe the operation of my improved instrument for determining the precise compass reading for an observed point. The instrument is conditioned as above described for determination of the first line, i. e., the scales S and S–1 are so related that the 0 marks thereof precisely register. The shaft 8 is unlocked relative to the post by releasing collar 18. The cylinder 13 is rotated until the indicator mark S–3 of the scale S–2 is brought into close proximity of the point of the magnetic needle 16 (Fig. 8). As above explained, this rotation of the cylinder 13 carries the drum 11 with the cylinder 13, maintaining the adjusted positions of the scales S and S–1. The shaft 8 is locked, and as above explained, the cylinder 13 is rotated by manipulation of screw 6–e to register precisely the mark S–3 with the point of the needle 16, thereby determining the first line, i. e., the line from the instrument to magnetic north. The needle 16 is then locked in relation to scale S–2 by lever 16–b operated by rod 16–d. The above-described steps, for determining the second line, are then performed and the scale S–1 thereby adjusted relative to scale S indicates the precise compass reading of the observed point.

I will now describe the operation of the modified form of my improved instrument illustrated in Figs. 11 and 12. The instrument is conditioned, as above described, for determination of the first line, i. e., the scales M and M–1 are so related that the 0 marks thereof precisely register (Fig. 11). The instrument is then operated, as above described, to determine the first line. It is then operated, as above described, to determine the second line. During this last step in the operation of the instrument, the auxiliary scale M–1 which is mounted upon the cylinder 13 passes over the scale M which is on the fixed drum 11. When the instrument has been adjusted to determine the second line, the auxiliary scale M–1 has moved to the precise point on the scale M to indicate by the junction of the last line D to appear through window W of cylinder 13 with one of the lines of the scale M–1 (Fig. 12) the exact measure of the angle formed by the two lines from the instrument to the two observed points.

Having described my invention, what I claim is:

In an instrument for measuring the angle formed by two lines from the instrument to two observed points, the combination of a base; a post mounted on said base, adjustable relative thereto and having an axially disposed socket; a sleeve having a closed lower end with a central orifice therein, mounted in said socket, rotatable relative to said post and about a screw passed through said orifice and tapped into said post, said sleeve having an outwardly turned peripheral flange at its upper end; a hollow shaft, mounted in said sleeve, rotatable relative to said sleeve and having an outwardly turned peripheral flange resting upon the upper end of said sleeve, said shaft having an axial conical bore; a tapered solid shaft, mounted in said bore, rotatable relative to said hollow shaft and biased into yielding engagement with said hollow shaft; means adapted to clamp said sleeve to said hollow shaft to effect unitary rotation of said sleeve and said hollow shaft relative said post; means adapted to alternatively constrain said shafts to rotate as a unit and to effect rotation of said solid shaft relative to said hollow shaft; a main scale on said hollow shaft; an auxiliary scale on said solid shaft; and means mounted on said solid shaft for determining the two lines, said auxiliary scale being so related to said main scale as to move synchronously with said main scale during unitary rotation of the two shafts, and to move relative to said main scale during rotation of said solid shaft relative to said hollow shaft.

References Cited in the file of this patent

UNITED STATES PATENTS

| | | |
|---|---|---|
| 1,010,339 | Angel | Nov. 28, 1911 |
| 1,532,297 | Bausch et al. | Apr. 7, 1925 |
| 1,827,093 | McCabe | Oct. 13, 1931 |
| 2,618,696 | Oliver | Nov. 18, 1952 |

FOREIGN PATENTS

| | | |
|---|---|---|
| 372,836 | France | Mar. 1, 1907 |